United States Patent [19]

Hiltz

[11] Patent Number: 4,745,689

[45] Date of Patent: May 24, 1988

[54] MULTIFUNCTIONAL MEASURING AND LAYOUT TOOL

[76] Inventor: Paul J. Hiltz, 61 Barnstable St., Hull, Mass. 02045

[21] Appl. No.: 2,210

[22] Filed: Jan. 12, 1987

[51] Int. Cl.⁴ ............................................. B43L 7/06
[52] U.S. Cl. ..................................... 33/451; 33/471; 33/DIG. 1
[58] Field of Search ................. 33/421, 451, 471, 495, 33/500, DIG. 1

[56] References Cited

U.S. PATENT DOCUMENTS

| | | | |
|---|---|---|---|
| 1,341,435 | 5/1920 | Olsen | 33/495 |
| 1,585,563 | 5/1926 | Schlattau | 33/471 |
| 3,093,919 | 6/1963 | Holtz | 33/DIG. 1 |
| 3,942,252 | 3/1976 | Roach et al. | 33/471 |
| 4,097,999 | 7/1978 | Nowlin | 33/500 |
| 4,348,815 | 9/1982 | Hurt | 33/495 |
| 4,394,801 | 7/1983 | Thibodeaux | 33/471 |
| 4,481,720 | 11/1984 | Sury | 33/471 |
| 4,654,978 | 4/1987 | Wolford, Jr. | 33/DIG. 1 |

FOREIGN PATENT DOCUMENTS

| | | | |
|---|---|---|---|
| 78815 | 1/1919 | Switzerland | 33/471 |
| 119749 | 4/1927 | Switzerland | 33/471 |

Primary Examiner—Richard R. Stearns
Attorney, Agent, or Firm—John M. Brandt

[57] ABSTRACT

A multifunctional tool having elements adapted to function as a level, bevel, protractor, square, and scale. Indicia are inscribed on mutually rotatable components of the tool for determining a mitre. The tool may include a magnet on the base to hold it in position on a metal surface.

3 Claims, 1 Drawing Sheet

MULTIFUNCTIONAL MEASURING AND LAYOUT TOOL

BACKGROUND OF THE INVENTION

This invention relates generally to a combination tool used by workmen in the building trades, such as plumbers, roofers, masons, carpenters and the like.

More specifically, it is a combination tool including five functional elements, namely, a level, bevel, protractor, square, and scale.

Combination tools have been known for many years as indicated by the U.S. Pat. No. 717,871, to Joseph Leitschuh, issued Jan. 6, 1903. This particular patent discloses a combination rule, compass, divider, protractor, T square, bevel and a trammel. Other combination tools disclosed in the U.S. Pat. Nos. 937,020; 2,247,327; 2,399,303; 2,505,437; 2,728,989; 2,741,030; 3,364,581; 3,522,657 and 4,144,650.

SUMMARY OF THE INVENTION

The multifunctional tool of the present invention has a base with a magnetic tape provided on the bottom surface. The base extends along and in right angle relationship to a long edge of the body portion.

The body portion of the tool has an arced terminal end with a top surface and a bottom surface to which an angle arm, which also has an arced terminal end, is rotatably connected. The arced terminal end of the angle arm is butted against the bottom surface of the body portion. The face of the arced end of the angle arm facing away from the bottom surface is marked in four 90 degree segments starting at 0 degrees on a point on the circumference and going in a clockwise direction. The opposite side of the arced end of the angle arm, butted into the bottom surface is marked into four 90 degree segments starting at 90 degrees on the point on the circumference and going in a clockwise direction. A through aperture in the body portion permits the operator to see various degree numbers marked on the opposite side of the arced end of the angle arm permitting the rotated angle arm to be used as an easily read mitre. The angle arm arced terminal end in combination with the rotatability of the angle arm permits these elements to be used as a protractor and also as a bevel.

If desired, one edge of the angle arm can be marked on a scale using the English system and the other edge can be marked using the metric system. Since the angle arm is rotatable, it can be used as a square in combination with a long edge of the body portion.

The central area of the body portion may be provided with different bubble vials for use as levels. The vials may be positioned in parallel relation to the base, or at a 45 degree angle or 90 degree angle. The various features and advantages of the invention will be more fully understood from the description of the preferred embodiment and drawings which follow.

DESCRIPTION OF THE PREFERRED EMBODIMENT

Figure 1:
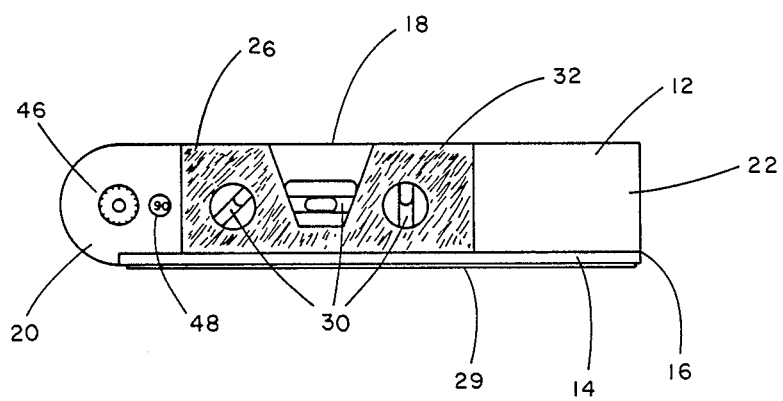
FIG. 1 is a front elevational view of the preferred embodiment of the invention.
Figure 2:
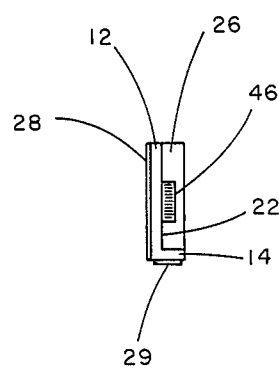
FIG. 2 is an end elevational view of the tool shown in FIG. 1.
Figure 4:
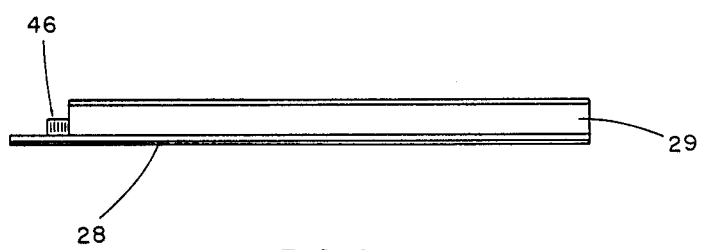
FIG. 4 is a bottom plan view of the tool shown in FIG. 1.
Figure 3:
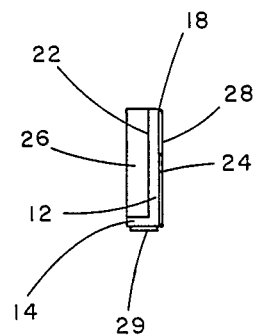
FIG. 3 is an end elevational view of the tool shown in FIG. 1 taken from the opposite end of FIG. 2.

There is shown in the drawings a multifunctional tool 10 comprising a body portion 12 and a base 14; the body portion 12 is generally rectangular, flat, has spaced first and second long edges 16, 18 which merge into an arced terminal end 20 and which body portion has a top surface 22 and a bottom surface 24. The body portion 12 functions as a platform to which a level means 26 and a blade or angle 28 are attached. The base 14 is integral with and extends from the first long edge 16 as well as being in right angle relation to the horizontal plane of the body portion 12. A magnetic tape 29 is attached by adhesive, for example, to the bottom of the base 14.

The level means 26 includes a series of three bubble vials 30 which are mounted in through openings formed in a plastic housing 32. As disclosed in FIGS. 1 and 5, one of the vials 30 is mounted so that its axis is at angle of 45 degrees with the first long edge 16; another is parallel with the first long edge 16 and the last is mounted so that its axis is at 90 degrees with the first long edge 16.

Figure 5:
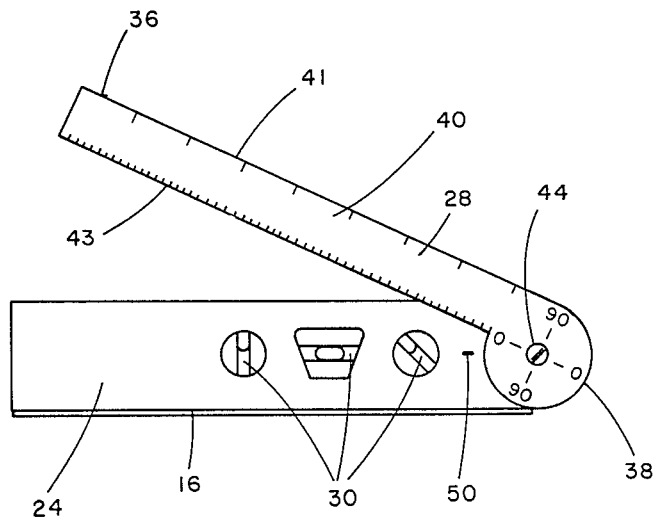
FIG. 5 is a rear elevational view of the tool shown in FIG. 1.
Figure 6:
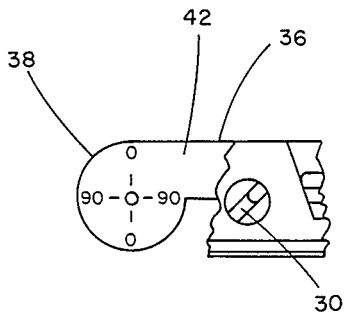
FIG. 6 is a front elevational view of the tool shown in FIG. 1 with the arced terminal end and the right side of the body portion broken away.

The protractor arm or angle arm 28 is formed of, for example, stainless steel having a rectangular shank portion 36 that merges at one of its ends into a circular portion 38 as shown in FIG. 5. The circular portion 38 includes a through aperture formed at its center. The protractor arm 28 also includes a front face 40 and a rear face 42. The front face 40 of the shank portion 36, at the upper long edge 41, has, for example, an English scale marked thereon and at the lower edge 43, for example, has a metric scale marked thereon. The front face 40 of the circular portion 38 is divided at its periphery into four segments. Each segment in turn being divided and marked into 90 degrees in the following manner: starting at the point where the lower long edge of the shank portion 36 intersects the circular portion 38 and moving in a clockwise direction from 0 degrees to 90 degrees to 0 degrees to the point of beginning. The rear face 42 of the circular portion 38 is also divided at its periphery into four segments. Each segment in turn being divided and marked into 90 degrees in the following manner: starting at the point where the lower long edge of the shank portion 36 intersects the circular portion 38 and moving in a clockwise direction from 0 degrees to 90 degrees to 0 degrees to the point of beginning.

The protractor arm 28 is assembled with the arced terminal end 20 of the body portion 12 by butting the rear face 42 of the circular portion against the bottom surface 24 with it centrally positioned through the aperture of the circular portion 38 coaxially aligned with a through aperture centrally formed in the arced terminal end 20. The shank of a headed screw 44 is passed through the apertures of the circular portion 38 and the arced terminal end 20 with the head butted against the front face 40 and the shank extending beyond the top surface 22 of the arced terminal end 20. A nut 46 having a knurled peripheral edge is threaded onto the shank of the head screw 44 into abutting relation with arced terminal end 20 thus holding the protractor arm 28, and the body portion 12 together while permitting the protractor arm 28 to rotate about the shank of the headed screw 44. A window opening 48 is formed through the body portion 12 and is positioned to the right of the aperture through which the headed screw 44 extends and shows the 90 degree mark of the rear face 42 of the circular portion 38 at the point where the lower long edge of the shank portion 36 intersects the circular portion 38 and the shank portion 36 is in its fully nonrotated position.

The tool 10 is used as a level by placing the base 14 on the surface to be tested for flatness, vertically or horizontally. If the surface is metal, for example, the magnetic tape 29 will hold the tool to the surface permitting the operator to use both hands. The bubble vials 30 are used in a manner well known in the art.

The tool 10 may be used as a protractor for measuring angles. For example, by placing the first long edge 18 in parallel relation to and on the same horizontal plane as one side of the angle to be measured, the protractor arm 28 is then rotated until either the upper or lower long edge of the shank portion 36 is in parallel relation to and on the same horizontal plane at the other side of the angle to be measured and the angle is then read on the degrees marked on circular portion 38 at the starting point line 50 scribed on the bottom surface 24 adjacent to the edge of the circular portion 38 and in parallel spaced relation with the first long edge 18. If the angle to be measured is greater than 90 degrees, then 90 degrees should be added to the degree measured that results from subtracting the degree reading at the starting point 50 line from 90 degrees.

The tool 10 can be used as a square by rotating the shank portion 36 of the protractor arm 28 in a clockwise or counterclockwise direction until the first 90 degree mark reached on the circular portion 38 is aligned with the starting point line 50. The angle between the edge of the shank portion 36 and the long edge of the body portion 12 that meets that edge is 90 degrees. The tool 10 is then utilized as a square.

The use of the English and metric scales provided on the protractor arm 28 is well known.

The tool 10 may be used to determine a mitre, by first determining the angle for which a mitre is needed either from data (for example, a blueprint) or by measurement using the tool 10 on the front face 40 of the protractor arm 28, then divide that angle by 2, turn the tool 10 over and turn the protractor arm 28 until the window 48 of the body portion 12 reveals the number obtained by the division. The protractor arm 28 and body portion 12 will define the mitre.

The use of the protractor arm 28 and body portion 12 as a bevel, to determine a roof angle, for example, is obvious to those skilled in the art.

What is claimed is:

1. A multifunctional tool comprising a body portion and an angle arm, the body portion having an arced terminal end and having a front surface and a rear surface, the angle arm having a shank portion and a circular portion, the shank portion having an end, the circular portion integral with and extending from the shank portion end lying on the same horizontal plane as that on which the shank portion lies, the circular portion having a front face and a rear face, the circular portion of the angle arm rotatably engaged to the arced terminal end of the body portion, the rear face of the circular portion faces the front surface of the arced terminal end and the front face of the circular portion includes first indicia means having a first starting point positioned on the circumference thereof, the first indicia means in degrees positioned on the circumference of the circular portion beginning at the first starting point with 0 degrees and proceeding in a clockwise direction to 90 degrees then to 0 degrees then to 90 degrees then to the beginning, the rear face of the circular portion includes second indicia means in degrees positioned on the circumference of the circular portion beginning at a second starting point, opposite to the first starting point, with 90 degrees and proceeding in a clockwise direction to 0 degrees then to 90 degrees then to 0 degrees then to the beginning, the arced terminal end of the body portion having a through aperture formed therein whereby at least a single indicia on the rear face of the circular portion may be observed through the aperture.

2. A multifunctional tool as set forth in claim 1 further including a bubble vial mounted in the body portion whereby the bubble vial is visible to an operator.

3. A multifunctional tool as set forth in claim 1 further including magnetic means attached to said body portion for securing said tool in position on a metal surface.

* * * * *